C. G. & G. W. DOOLEY.

KNIFE BLADE SCRAPER.

APPLICATION FILED JAN. 24, 1913.

Reissued June 17, 1913. 13,577.

Witnesses

W. H. Sliper

A. C. Hines.

Inventors

Chester G. Dooley &

George W. Dooley,

By Victor J. Evans,

Attorney.

COLUMBIA PLANOGRAPH CO., WASHINGTON, D. C.

UNITED STATES PATENT OFFICE.

CHESTER G. DOOLEY AND GEORGE W. DOOLEY, OF SAN BERNARDINO, CALIFORNIA.

KNIFE-BLADE SCRAPER.

13,577. Specification of Reissued Letters Patent. Reissued June 17, 1913.

Original No. 1,002,045, dated August 29, 1911, Serial No. 626,905. Application for reissue filed January 24, 1913. Serial No. 744,033.

*To all whom it may concern:*

Be it known that we, CHESTER G. DOOLEY and GEORGE W. DOOLEY, citizens of the United States, residing at San Bernardino, in the county of San Bernardino and State of California, have invented new and useful Improvements in Knife-Blade Scrapers, of which the following is a specification.

The present invention provides a tool designed most especially for the use of electricians, whereby the insulation may be cut from wires and the latter scraped to provide a bright surface either for soldering or to insure electrical contact being had when attached to another wire or to a binding post or other part of electrical apparatus.

The present invention provides a knife blade having the usual keen cutting edge and preferably, but not necessarily, two scraping edges, the latter being located along the back of the knife blade and formed by cut-away portions or channels in opposite sides of the blade and contiguous to and intersecting with the back, said channels also providing convenient means for opening the blade when pivotally connected to a handle so as to fold therein. When desired one of the channels or cut-away portions may be dispensed with, without materially sacrificing any of the advantages of the invention, except as to the provision of a single scraping edge instead of two.

The invention consists of the novel features, details of construction and combination of parts, which hereinafter will be more particularly set forth, illustrated in the accompanying drawing, and pointed out in the appended claims.

Figure 1:
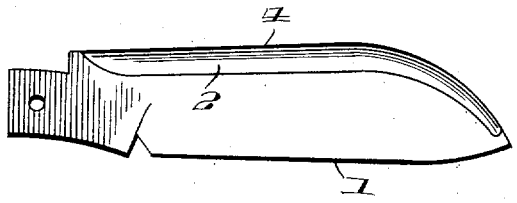
Figure 2:
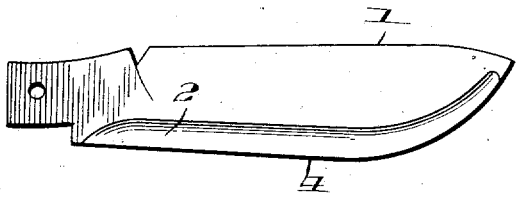
Figure 3:
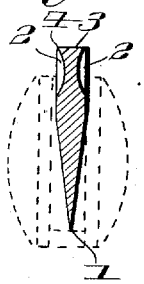

Referring to the drawing, forming a part of the specification, Figures 1 and 2 are respectively obverse and reverse views of a knife blade embodying the invention. Fig. 3 is a transverse section of the blade, the dotted lines showing the outline of a handle when the blade is arranged to fold therein.

Corresponding and like parts are referred to in the following description, and indicated in all the views of the drawing, by the same reference characters.

The knife blade may be of any outline and its sides incline and intersect to form the usual keen cutting edge 1. Cutaway portions comprising channels 2 in the embodiment shown are formed in opposite sides of the knife blade near the back thereof, and wholly between the back and longitudinal axis of the blade and preferably but not necessarily extend from the point of the blade to the heel thereof, said channels being of substantially uniform depth and width throughout their length and having one side thereof terminating at the side edges of the back 3 of the knife blade, to form scraping edges 4. The knife blade may be attached to a handle in any manner and in the event of the blade being pivoted to a handle so as to fold therein, after the fashion of an ordinary pocket knife. The channels 2 afford positive and convenient means for gripping the blades between the thumb and fingers of the hand to enable ready opening of the knife without necessitating the use of an instrument of any kind to pry the blade open should the closing spring be strong or the blade be difficult to open.

The knife blade is of usual formation barring the side channels 2 and the scraping edges 4, hence it may be used for whittling or cutting where a keen edge is required. The channels 2 result in the formation of scraping edges 4, which operate in the same manner as the edges of an ordinary scraper of triangular form in cross section. The scraping edges 4 may be sharpened by grinding or rubbing the back 3, or the sides of the knife blade upon a whetstone. A lineman or other workman handling electric conductors may use the tool to cut insulation from the wires in the same manner as a pocket knife and may subsequently use the scraping edges 4 for brightening the wire for any purpose, thereby avoiding the necessity for dulling the keen edge of the knife blade by using the same as a scraper.

While two cutaway portions or channels are shown on the sides of the knife blade, producing a corresponding number of scraping edges, it is obvious that one of them may be dispensed with, without departing from or sacrificing any of the advantages of the invention.

The cutaway portions 2, in Fig. 3, are shown as concave channels, but may obviously be made V, triangular, or any desired shape that efficiency in service or convenience in manufacture may suggest.

From the foregoing description, taken in connection with the accompanying drawing, the advantages of the construction and of the method of operation will be readily apparent to those skilled in the art to which the invention appertains, and while we have described the principle of operation of the invention, together with the device which we now consider to be the embodiment thereof, we desire to have it understood that the device shown is merely illustrative, and that such changes may be made when desired, as are within the scope of the claims appended hereto:

We claim:

1. A knife blade having the usual keen cutting edge and having channels in opposite sides adjacent the back and having the walls of the channels intersecting with the back to form oppositely disposed scraping edges.

2. A knife blade having its opposite sides inclined and intersecting to form a keen cutting edge, and having one end rounded to a point, said blade having channels in opposite sides extending from the point to the heel thereof, the walls of the channels intersecting with the back to form oppositely disposed scraping edges.

3. A knife blade having its sides converging continuously throughout the major portion of the distance between its front and back to present a keen cutting edge at the front, and having a lateral cut-away portion wholly contiguous to and intersecting the back to produce a scraping edge at the point of intersection, said cut-away portion being of less transverse extent than one half the width of the blade and disposed wholly between the back and longitudinal axis of the blade.

4. A blade having its opposite sides inclined and intersecting to form a keen cutting edge, said blade having also a narrow lateral channel located wholly in rear of the longitudinal axis of the blade and forming a scraping edge at the intersection of the back and one of the said inclined sides of the blade.

In testimony whereof, we affix our signatures in the presence of two witnesses.

CHESTER G. DOOLEY,
GEORGE W. DOOLEY.

Witnesses:
EDITH M. ADAMS,
L. R. PATTY.

Copies of this patent may be obtained for five cents each, by addressing the "Commissioner of Patents, Washington, D. C."